3,538,060
PROCESS FOR THE POLYMERIZATION OF
LACTAMS IN ALKALINE MEDIUM
Siegfried Schaaf, Chur, Switzerland, and Peter S. Gaut,
Leicester, England, assignors to Inventa A.G. fur
Forschung und Patentverwertung, Zurich, Switzerland,
a corporation of Switzerland
No Drawing. Continuation-in-part of application Ser. No.
587,660, Oct. 19, 1966. This application Apr. 28, 1969,
Ser. No. 820,009
Claims priority, application Switzerland, Oct. 25, 1965,
14,784/65
Int. Cl. C08g 20/12
U.S. Cl. 260—78                                7 Claims

ABSTRACT OF THE DISCLOSURE

An improved process is provided for producing substantially insoluble cross-linked and branched polymers having extremely high impact resistance.

Lactams having more than 6 ring members and mixtures thereof are polymerized in the presence of an alkaline polymerization catalyst and a cocatalyst, and at a temperature of substantially 100–270° C. The cocatalyst has the recurring unit

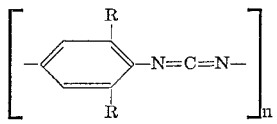

wherein R is an alkyl having 1–4 carbon atoms and $n$ is 3 to about 100.

---

The present application is a continuation-in-part of application Ser. No. 587,660, filed Oct. 19, 1966, now abandoned.

The present invention relates to improvements in the lactam polymerization in alkaline medium. More particularly, it relates to the use of a cocatalyst which leads to cross-linked or branched polyamides of greatly improved properties.

The polymerization of anhydrous lactams initiated by alkali metal compounds is known. It also is known that the polymerization can be accelerated by the addition of diacylimides, esters of organic and inorganic carboxylic acids, carboxylic acid halides and anhydrides, carboxylic acid cyanamides, isocyanates, isothiocyanates, ureas, monocarbodiamides, thiourea, urethanes, guanidine, sulfuric acid derivatives, n-halogen lactams, carbamic acid esters, organic carbonates, perhalogenated ketones, lactamethers, substituted triazines, and others. These additives permit carrying out the polymerization even at temperatures which are lower than the melting point of the polyamides formed, so that a solid end product is obtained which attains the shape of the vessel wherein the reaction is carried out.

Catalysts for the polymerization of lactams are, e.g., alkalilactams and substances which are capable of forming lactamalkali metal compounds with lactams, e.g., alkalimetalalkyls, alkali metals, alkalihydrides, alkalihydroxides, alkalicarbonates and also Grignard compounds such as alkylmagnesiumbromide. The concentration of these catalysts generally is 0.1 to 1.5 mol percent. However, larger quantities, up to 5 mol percent, can be employed.

The parts thus cast consist of polyamides of linear construction and, upon application, have the known disadvantages such as tension crack corrosion, low notched impact strength (especially in dry state) and strong swelling in certain organic solvents. The polymers are soluble in the usual solvents, e.g., in concentrated sulfuric acid.

It now has been found that cross-linked or branched polyamides can be produced which have particular properties, by polymerizing anhydrous lactams having more than 6 ring members in the presence of the hitherto known alkaline catalysts, but with the addition of definite aromatic polycarbodiimides. The polymers thus obtained are insoluble in concentrated sulfuric acid and have an extremely high notched impact resistance. Applicable lactams having more than 6 ring members are, e.g., caprolactam, oenantholactam, caprylolactam and laurolactam. The process for the polymerization of these lactams in alkaline medium at temperatures of essentially 100–270° C. has as its salient feature the employment of a cocatalyst comprising a mixture of molecules of varying chain length containing the recurring unit:

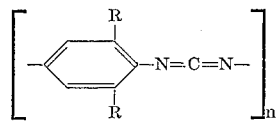

wherein R is an alkyl of 1 to 3 carbon atoms and $n$ is a number ranging between 3 and 100. The temperature for the anionic polymerization of the lactam is 100–270° C., and preferably 140–160° C.

The concentration of the cocatalyst may vary within wide limits. Ordinarily, 0.2–5 weight percent, calculated on the lactam present, are employed, and preferably 0.3–1.5 weight percent.

In the polymerization, not only the lactams named above may be used but also mixtures of two or more thereof leading to copolymers.

Light and heat stabilizers, matting agents, dyes and pigments, and fillers such as finely divided metal, glass fibers, asbestos fibers, and others may be incorporated in the polymerization mixture.

According to the invention, the catalyst and cocatalyst may simply be mixed into the lactam, followed by heating of the mixture to the polymerization temperature. However, we prefer to add the catalyst to the molten lactam and to incorporate the cocatalyst after polymerization temperature has been attained. The polymerization is completed within 1–2 hours at the most, depending upon the concentration of the cocatalyst. A polyamide casting thus is produced which essentially has the shape and dimensions of the mold. Since a slight shrinkage occurs, the removal from the mold is easy. The polymerization itself preferably is carried out under exclusion of air and moisture. However, this is not required when the surfaces of the casting are to be finished mechanically.

The polyamides produced in this manner constitute highly valuable plastics and, due to their branched or cross-linked state, are particularly resistant to mechanical, thermic and chemical influences. Even when they are of large dimensions, they are free of stresses and voids. The monomer content corresponds to the normal temperature equilibrium and is 0.3–6 weight percent.

The shrinkage in the mold is uniform and slight so that the process according to the invention lends itself to the manufacture of wheels, casters, rollers, pipes, profiled parts, rods, tracks or skids, and the like.

If the polymerization occurs above the melting point, the process can be carried out continuously.

The polycarbodiimides employed as cocatalysts according to the present invention are substances of a highly viscous to resinous to brittle nature which are more or less sparingly soluble or insoluble in water, ethanol and acetone.

These polycarbodiimides may be prepared from diisocyanates in the presence of catalytic quantities of phospholines and their oxides and sulfides (see French Patent 1,180,307) or by heating in the presence of tertiary amines, alkalimetal compounds, alkaline earth metal compound, carboxylic acid metal salts or non-basic organometallic compounds (see German Patent 1,156,401). Suitable diisocyanates are 2,6-dimethylbenzene-1,4-diisocyanate, 2,6 - diethylbenzene - 1,4 - diisocyanate, 2,6-di-n-propylbenzene - 1,4 - diisocyanate and 2,6-di-isopropylbenzene - 1,4 - diisocyanate. According to the present invention the polycarbodiimide obtained from 2,6-di-isopropylbenzene - 1,4 - diisocyanate, is preferred.

For the performance of the second named method of preparation the isocyanate is treated with the cocatalyst. The amount of cocatalyst to be employed is based upon the amount of isocyanate employed and is preferably 0.01 to 10%. The reaction is carried out at temperatures of at least 120° C. and preferably at 120–300° C. The temperature employed and the reaction time depend upon the amount of catalyst present and the catalyst's activity. The reaction can be carried out in an inert atmosphere as, for example, nitrogen or carbon dioxide, and in the presence of a solvent as, for example, aliphatic and aromatic hydrocarbons and esters.

In the reaction in question, known per se, isocyanate groups of different diisocyanate molecules react together and form carbodiimide groups. Carbon dioxide is split off. The reaction may be controlled by the determination of this carbon dioxide. No polycarbodiimides with practically infinite chain length are built up. The product obtained consists of polycarbodiimide chains with 3–100 carbodiimide groups and has practically no or only very few determinable isocyanate groups. However, the polycarbodiimide molecules formed do not have one definite chain length. A mixture of polycarbodiimides with varying chain length is obtained. The number of carbodiimide groups in the molecules of the polycarbodiimides comprising said mixture ranges from 3 to 100.

The invention now will be further explained by the following examples. However, it should be understood that these are given merely by way of illustration, and not of limitation, and that modifications and changes may be made in the details without departing from the spirit and the scope of the invention as hereinafter claimed.

The temperatures given are in degrees centigrade. Percentages or parts are by weight, unless otherwise identified. The term "DIN" in certain test results denotes "Deutsche Industrial Normen" (German Industrial Standards) which are official standards similar to the ASTM standards.

EXAMPLE 1

10 kg. caprolactam were heated to 150° C., and 0.42 mol percent ethylmagnesiumbromide (as 40% solution in diethylether) added. After evaporation of the solvent, 1.15% poly(o,o-dimethyl)-p-phenylenecarbodiimide were stirred in. The mixture was put in an oven of 150° C., and polymerization started after 40 minutes. After 2 hours, the polymer had assumed the shape of the reaction vessel. The polycaprolactam thus obtained was insoluble in concentrated sulfuric acid.

Test bodies were mechanically produced from the polymer block and had an immeasurably high notched impact strength, when tested according to DIN 53453 (more than 500 cm.kp./cm.$^2$). The poly(o,o-dimethyl)-p-phenylenecarbodiimide was produced as follows:

100 parts 2,6-dimethylbenzene-1,4-diisocyanate were stirred for 3 hours at 200° C. with 2 parts lead naphthenate, whereby strong $CO_2$-development occurred. The residue was insoluble in the usual solvents and was used directly as cocatalyst. A cocatalyst with the same properties was obtained when 100 parts of the above isocyanate was stirred for 2¼ hours at 190° C. with 6 parts of lead naphthenate. The poly(o,o-dimethyl)-p-phenylene-carbodiimide cocatalyst was found to be a mixture of polycarbodiimides of varying chain lengths. The number of carbodiimide groups in the carbodiimide molecules comprising said mixture was found to range from 3 to 100.

EXAMPLE 2

10 kg. caprolactam were polymerized as described in the preceding example using 0.4% of the cocatalyst named therein. The polymerization occurred within 2 hours at 150° C.

The relative viscosity was immeasurable because the polymer was insoluble in concentrated sulfuric acid. The notched impact strength also was not measurable according to DIN 53453 (higher than 500 cm.kp./cm.$^2$).

The cocatalyst was prepared by reacting 100 parts of 2,6-dimethylbenzene-1,4-diisocyanate for 4 hours at 190° C. with 0.5 part of alcoholic KOH (25%).

The poly(o,o-dimethyl)-p-phenylenecarbodiimide cocatalyst was found to be a mixture of polycarbodiimides of varying chain lengths. The number of carbodiimide groups in the carbodiimide molecules comprising said mixture was found to range from 3 to 100.

EXAMPLE 3

A mixture of 16 kg. caprolactam and 4 kg. laurolactam were heated in a ring-shaped mold in an oven at 145° C. 0.5 mol percent of the sodium salt of caprolactam were added to the melt, followed by 0.8 weight percent poly(o,o'-diisopropyl)-p-phenylenecarbodiimide.

The poly(o,o' - diisopropyl)-p - phenylenecarbodiimide had been produced by heating 100 parts 2,6-diisopropylbenzene-1,4-diisocyanate with 2 parts lead naphthenate for 3 hours at 200° C., whereby strong $CO_2$ development took place. The residue did not show a sharp melting point, but a softening between 70° and 80° C. and was used directly as cocatalyst. It was very easily soluble in benzine, benzene, carbon tetrachloride and acetic acid ethyl ester, hardly soluble in acetone and practically insoluble in ethanol and water.

A cocatalyst having essentially the same properties as the cocatalyst obtained above was obtained when 100 parts of 2,6 - diisopropyl - benzene-1,4-diisocyanate was heated with 4 parts of molybdene glycolate for 10 hours at 200° C. or with 5 parts of iron acetylacetonate for 19 hours at 200° C. The poly(o,o'-diisopropyl)-p-phenylenecarbodiimide was found to be a mixture of polycarbodiimides of varying chain lengths. The number of carbodiimide groups in the polycarbodiimide molecules comprising said mixture was found to range from 3 to 100.

EXAMPLE 4

0.2 mol percent sodium salt of caprolactam and 0.4 mol percent diisopropylcarbodiimide (Ber. 74, 1285 (1941)) were stirred into 1 mol molten caprolactam at a polymerization temperature of 175°. The linear polyamide thus produced had a viscosity of $\eta=1.88$.

When 0.4 mol percent dicyclohexylcarbodiimide (Ber. 74, 1285 (1941)) were used, the polyamide had a viscosity $\eta=2.0$.

The polymer castings obtained according to this example, in dry state, had a notched impact strength of 3–4 cm. kp./cm.$^2$ (DIN 53453).

With the use of monomeric carbodiimides, the measured solution viscosity of the polymer is a function of the concentration of the carbodiimide, i.e., with higher quantities a lower degree of polymerization is attained.

Whereas in the preceding examples only caprolactam and a mixture thereof with laurolactam had been used, comparative results were obtained with the other lactams named and mixtures of two or more thereof. The diisopropylcarbodiimide and the dicyclohexylcarbodiimide were both found to be a mixture of monocarbodiimides of varying chain lengths. The number of carbodiimide groups in the monocarbodiimide molecules comprising said mixtures was found to range from 3 to 100.

What is claimed is:

1. In a process for producing substantially insoluble cross-linked and branched polymers having an extremely high impact resistance, which process comprises the step of polymerizing lactams having more than 6 ring members and mixtures thereof in the presence of an alkaline polymerization catalyst and at temperatures of substantially 100–270° C., wherein the improvement comprises employing a cocatalyst in said polymerization step, said cocatalyst being a mixture of polycarbodiimides of varying chain lengths, each of said polycarbodiimides having as the recurring unit thereof

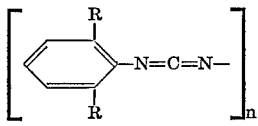

wherein R is an alkyl having 1–4 carbon atoms and $n$ is 3 to 100.

2. The process as defined in claim 1, wherein 0.3–1.5 weight percent of said cocatalyst are employed, calculated on the quantity of lactam to be polymerized.

3. The process as defined in claim 1, wherein the polymerization temperature is substantially 140–160° C.

4. The process as defined in claim 1, wherein said lactams are selected from the group consisting of caprolactam, oenantholactam, caprylolactam, laurolactam, and mixtures of one or more of said lactams.

5. The process as defined in claim 4, wherein said lactam is caprolactam.

6. The process as defined in claim 1, wherein said cocatalyst is selected from the group consisting of poly-(o,o-dimethyl)-p-phenylenecarbodiimide and poly(o,o'-dipropyl)-p-phenylenecarbodiimide.

7. The process as defined in claim 6, wherein said cocatalyst is present in quantities ranging substantially from 0.3 to substantially 1.5 weight percent, calculated on the lactam present.

References Cited
UNITED STATES PATENTS 3,015,652  1/1962  Schnell et al.
3,423,372  1/1969  Steely.

WILLIAM H. SHORT, Primary Examiner

L. M. PHYNES, Assistant Examiner